United States Patent [19]
Hajek et al.

[11] 3,892,634
[45] July 1, 1975

[54] SEPARATION OF 2,4' AND 4,4' METHYLENE BIS(PHENYL ISOCYANATE) FROM POLYMETHYLENE POLYPHENYL POLYISOCYANATES

[75] Inventors: James D. Hajek, Houston; Howard R. Steele, Baytown, both of Tex.

[73] Assignee: The Upjohn Company, Kalamazoo, Mich.

[22] Filed: Feb. 20, 1973

[21] Appl. No.: 334,048

[52] U.S. Cl.................... 203/72; 203/89; 203/73; 260/453 OH; 260/453 A
[51] Int. Cl.............................................. B01d 3/00
[58] Field of Search............ 203/72, 73, 74, 75, 77, 203/78, 80, 89; 260/453, 77.5 NC, 77.5 AT

[56] References Cited
UNITED STATES PATENTS

| | | | |
|---|---|---|---|
| 3,140,305 | 7/1964 | Lowenstein | 260/77.5 AT |
| 3,183,112 | 5/1965 | Gemassmer | 260/77.5 AT |
| 3,211,631 | 10/1965 | Fuchs | 203/77 |
| 3,410,888 | 11/1968 | Hammond | 203/72 |
| 3,457,291 | 7/1969 | Baylor | 260/77.5 AT |
| 3,471,543 | 10/1969 | Sayigh | 203/72 |
| 3,505,176 | 4/1970 | Buchsbaum et al. | 203/73 |
| 3,544,611 | 12/1970 | Michelet et al. | 203/78 |
| 3,554,872 | 1/1971 | Chang et al. | 203/89 |
| 3,565,768 | 2/1971 | Grant et al. | 203/89 |
| T875,017 | 6/1970 | Bailor et al. | 203/89 |

*Primary Examiner*—Norman Yudkoff
*Assistant Examiner*—Frank Sever
*Attorney, Agent, or Firm*—Denis A. Firth; John Kekich

[57] ABSTRACT

An improved process is described for continuously and simultaneously producing substantially pure methylenebis(phenyl isocyanate) as one product and a mixture of polymethylene polyphenyl polyisocyanates as the other. The feed polymethylene polyphenyl polyisocyanate [containing a major proportion of methylenebis(phenyl isocyanate)] is subjected to partial distillation in a first thin film evaporator, the overhead is subjected to fractionation to remove a minor proportion as overhead enriched in 2,4'-isomer, the bottoms fraction from the fractionator is subjected to a second partial distillation in a second thin film evaporator to remove a minor proportion as overhead which is returned to the fractionator. The undistilled bottoms from the second evaporator is subjected to a third partial distillation to remove the desired 4,4'-methylenebis(phenyl isocyanate) as an overhead product and to remove a minor proportion as undistilled bottoms. The undistilled bottoms fraction from the first thin film evaporator is recovered as polymethylene polyphenyl polyisocyanate containing a lower proportion of diisocyanate than the original feed. The advantages of the new process include (i) much shorter exposure to heat of the undistilled polymethylene polyphenyl polyisocyanates bottoms fraction resulting in decreased possibility of degradation or other change in composition and (ii) increased purity of the 4,4'-methylene bis(phenyl isocyanate) end product and (iii) elimination of necessity for batch distillation of diisocyanate.

6 Claims, 1 Drawing Figure

SEPARATION OF 2,4' AND 4,4' METHYLENE BIS(PHENYL ISOCYANATE) FROM POLYMETHYLENE POLYPHENYL POLYISOCYANATES

BACKGROUND OF THE INVENTION

1. Field of the Invention

This invention relates to an improved process for the preparation of organic polyisocyanates and is more particularly concerned with an improved process for continuous separation of methylenebis(phenyl isocyanate) from mixtures of polymethylene polyphenyl polyisocyanates.

2. Description of the Prior Art

In U.S. Pat. No. 3,471,543 there is described a process for the simultaneous production of methylenebis(phenyl isocyanate) and of polymethylene polyphenyl polyisocyanate by partial stripping of methylenebis(phenyl isocyanate) from a feed stock of polymethylene polyphenyl polyisocyanate having a higher content of methylenebis(phenyl isocyanate) than that desired in the end product. Two principal embodiments are there disclosed. In one embodiment the process is carried out in a single pass through a thin film evaporator the desired amount of methylenebis(phenyl isocyanate) being taken off as volatile overhead and the polymethylene polyphenyl polyisocyanate [containing a reduced amount of methylenebis(phenyl isocyanate)] being recovered as undistilled bottoms.

In a second embodiment the feed polymethylene polyphenyl polyisocyanate is subjected to partial distillation in each of two thin film evaporators sequentially. In the first of these a small forecut is removed as volatile overhead and the bulk of the feed is removed as undistilled bottoms which are fed to the second thin film evaporator. In the latter the desired amount of methylenebis(phenyl isocyanate) is removed as volatile overhead and the undistilled bottoms represents polymethylene polyphenyl polyisocyanate having a reduced methylenebis(phenyl isocyanate) content as compared with the feed.

Recently, certain modifications have been introduced into commercial manufacturing processes for mixtures of polymethylene polyphenyl isocyanates which give rise to such mixtures in which the methylenebis(phenyl isocyanate) present therein is substantially completely in the form of the 4,4'-isomer, i.e., the 4,4'-isomer content of the diisocyanate is of the order of 98 percent by weight or even higher, the remainder of the diisocyanate being present in the form of the 2,4'-isomer and, in certain cases, 2,2'-isomer. This is in contrast to the older commercial processes which gave rise to polymethylene polyphenyl polyisocyanates in which the diisocyanate contained only about 95 percent by weight or less of the 4,4'-isomer.

The advent of the newer polymethylene polyphenyl polyisocyanate feed stocks has enabled methylenebis(phenyl isocyanates) having much higher 4,4'-isomer content to be isolated in accordance with the process of the above-described U.S. patent.

The present invention is concerned with an improved process for continuous separation of diisocyanate from polymethylene polyphenyl polyisocyanates and is particularly adapted to use of the aforesaid newer feedstocks.

In the British Patent Specification No. 1,263,439 there is described a process for separating 4,4'-methylenebis(phenyl isocyanate) from polymethylene polyphenyl polyisocyanate feedstocks. The process described requires the use of a series of fractionation columns and conventional stills with consequently prolonged and undesirable exposure of diisocyanate to high temperatures.

SUMMARY OF THE INVENTION

This invention comprises an improved continuous process for the partial removal of methylenebis(phenyl isocyanate) from a feed mixture of polymethylene polyphenyl polyisocyanates containing a major proportion of methylenebis(phenyl isocyanate) wherein the improvement comprises the steps of:

a. subjecting said feed mixture in a continuous manner to a first partial distillation under reduced pressure in a thin film evaporator and continuously withdrawing methylenebis(phenyl isocyanate) as overhead and recovering polymethylene polyphenyl polyisocyanates as the undistilled bottoms fraction;

b. continuously passing said overhead from said first partial distillation to a fractionating column;

c. continuously removing an overhead fraction enriched in 2,4'-methylenebis(phenyl isocyanate) from said fractionating column;

d. continuously passing the bottoms fraction from said fractionating column as liquid feed to a second thin film evaporator wherein said feed is subjected to a second partial distillation under reduced pressure to recover a minor portion of said feed as overhead;

e. continuously returning said overhead fraction from said second partial distillation to said fractionating column employed in the previous stage;

f. subjecting said undistilled bottoms from said second partial distillation to a third partial distillation under reduced pressure in a third thin film evaporator in a continuous manner and recovering 4,4'-methylenebis(phenyl isocyanate) as overhead and methylenebis(phenyl isocyanate) residues as undistilled bottoms fraction, said overhead comprising the major proportion of the feed.

DETAILED DESCRIPTION OF THE INVENTION

Figure 1:
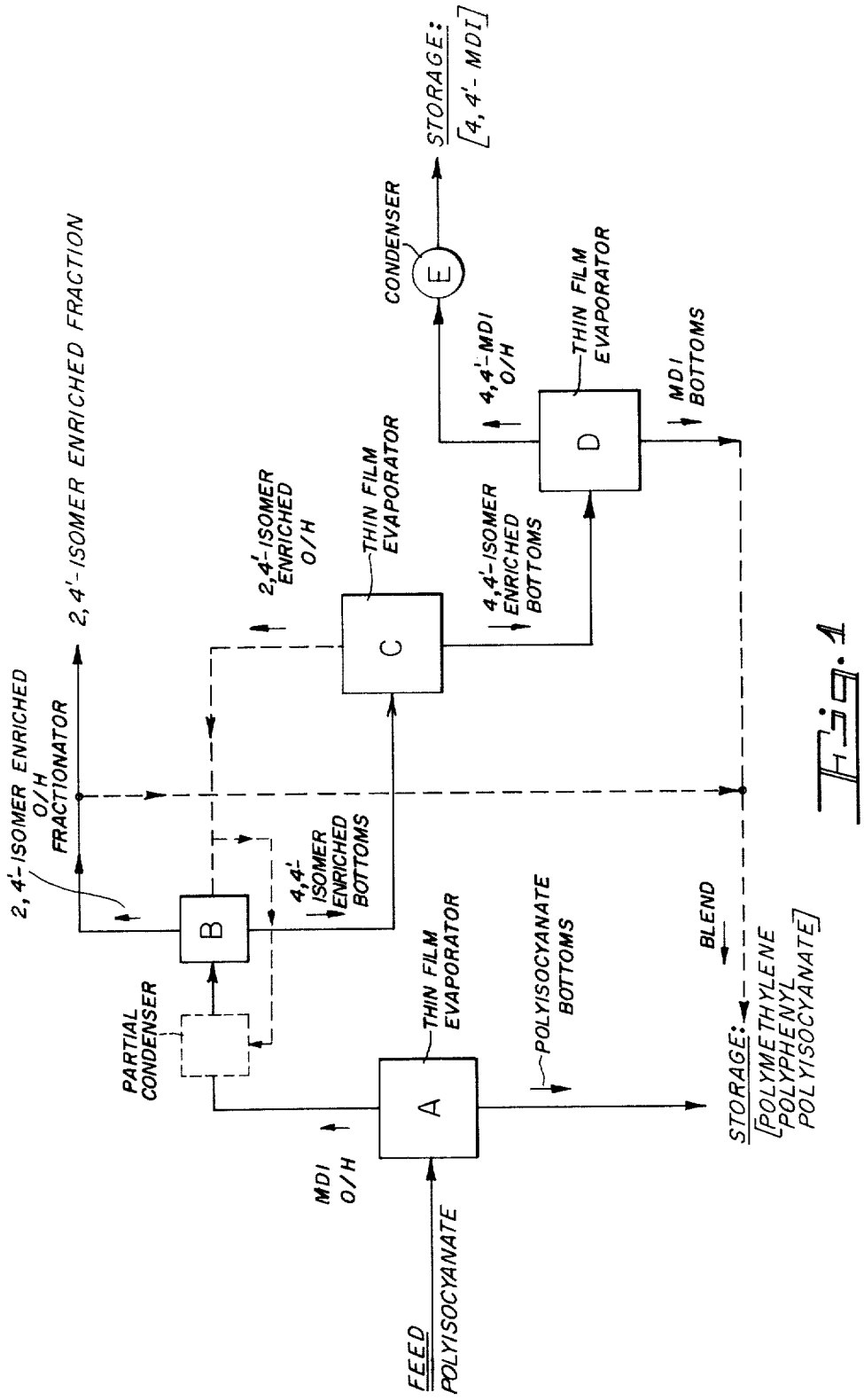
FIG. 1 shows a flow sheet illustrating schematically one embodiment of the process of the invention.

The polymethylene polyphenyl polyisocyanate which is employed as feed stock in the process of the invention is advantageously one which contains at least about 50 percent by weight of methylenebis(phenyl isocyanate) and preferably from about 60 percent by weight to about 85 percent by weight of methylenebis(phenyl isocyanate). In addition the polymethylene polyphenyl polyisocyanate is advantageously one in which the 4,4'-isomer content of the methylenebis(phenyl isocyanate) is at least about 95 percent by weight and preferably is at least 98 percent.

Methods for the preparation of feedstocks having the above characteristics have recently been described in the art; see, for example, Canadian Pat. No. 863,983 and Belgium Pat. No. 757,739 which latter describes a continuous process for preparing such feed stocks.

These feed stocks are produced by phosgenation of a solvent solution (generally a solution in chlorobenzene) of a corresponding mixture of polyamines which latter is prepared by condensation of aniline and formaldehyde under carefully controlled conditions designed to give the desired proportion of reactants in the end product as is described in the above references. Immediately prior to using the feed stock in the process of the invention the solvent is removed, e.g., by stripping in a falling film or like evaporator, from the solution of polyisocyanate. The process of the invention can be employed as the final step in existing processes for the preparation of the above feedstocks thereby yielding a substantially continuous process all the way from the aniline - formaldehyde condensation through to the separation of 4,4'-methylenebis(phenyl isocyanate) from polymethylene polyphenyl polyisocyanate.

Turning now to the flow sheet illustrated in FIG. 1, there is shown a schematic representation of a typical process in accordance with the invention. In this process the feed polyisocyanate is introduced continuously to a first thin film evaporator A.

The thin film evaporator (A) and the corresponding thin film evaporators employed in the later stages of the process of the invention can be any of the film evaporator units known in the art for the distillation of heat sensitive materials under a pressure lower than about 10 mm. of mercury. Such units include climbing thin film evaporators, falling thin film evaporators, spinning disc film evaporators, horizontal and vertical wiped film evaporators, and units which involve both climbing and falling films. Illustrative of the stills of the above types are those shown in U.S. Pat. Nos. 2,890,155, 2,927,634, 2,993,842, 3,020,211 and 3,060,107. In the above types of still the feed is caused to flow as a thin film through a heating zone in which the rate of heat transfer is very high. The more volatile component of the feed is removed as overhead and the undistilled portion of the feed is removed from a suitable point in the still, the overall residence time of the feed in the still being kept as short as possible.

In carrying out the process of the invention the pressure in the thin film evaporator A system is maintained very low, i.e., of the order of about 10 millimeters of mercury (absolute) or less and the feed rate and temperature in the still are adjusted to give the desired ratio of overhead [i.e., methylenebis(phenyl isocyanate) plus any lower boiling material] to undistilled bottoms. The temperature of the feed during its passage through the still (A) is advantageously within the range of about 340°F to about 425°F depending upon the pressure employed. Advantageously, the amount of methylenebis(phenyl isocyanate) taken off in this stage is adjusted so that the proportion of methylenebis(phenyl isocyanate) in the undistilled bottoms is not more than about 50 percent by weight and can be as low as 25 percent by weight.

The proportion by weight of overhead to undistilled bottoms recovered from the first thin film evaporator A depends upon the content of methylenebis(phenyl isocyanate) in the feed and the proportion of said diisocyanate which is desired in the undistilled bottoms fraction. As will readily be appreciated by one skilled in the art, the desired proportion can be achieved by adjusting the temperature and/or pressure in the thin film evaporator A and/or the rate of throughput. Although a wide range of said proportions can be achieved, it is generally desirable, from the standpoint of economics and ease of operation, that the proportion by weight of overhead to undistilled bottoms be of the order of about 0.5:1 to 4:1.

The fraction which is removed as overhead from the thin film evaporator A is then conducted continuously through a fractionator B. The latter can take various forms. Preferably the fractionator B is a packed fractionating column and, in an even more preferred form, the feed from still A is passed through a partial condenser preceded by a short packed section of column, prior to entry into the fractionating column.

The use of the latter combination serves to eliminate any traces of higher boiling materials which may have been entrained in the diisocyanate. In particular, it has been found that, generally speaking, the use of fractionator B has a beneficial effect on the chlorine content of the ultimate product.

The feed diisocyanate obtained as overhead in still A is passed continuously, preferably via the packed section and partial condenser, to an entry port situated at approximately the mid-point of a packed fractionating column. A minor proportion, of the order of 5 to 25 percent by weight of feed, is taken continuously from the head of the fractionating column and the bulk of the feed is taken continuously as liquid from the base of the fractionating column and is passed to the next stage in the continuous process of the invention.

The overhead fraction recovered from the head of the fractionator A is richer in 2,4'-isomer than the feed methylenebis(phenyl isocyanate) and also may contain more volatile materials which may not have been removed in the solvent stripping stage which preceded the process of the invention. This overhead fraction can be utilized in various ways. For example, it can be blended, at least in part, with the undistilled bottoms fraction of polymethylene polyphenyl isocyanate, or a portion thereof, recovered from the still A in the first step of the process of the invention. Alternatively, the 2,4'-isomer enriched fraction can be used alone, or after blending with other methylenebis(phenyl isocyanate) fractions, as a diisocyanate for purposes for which the content of 2,4'-isomer is not as critical as that of diisocyanate of "fiber" grade.

The removal of the overhead fraction richer in 2,4'-isomer from the head of the fractionator B necessarily produces a corresponding enrichment of 4,4'-isomer in the bulk of the methylenebis(phenyl isocyanate) recovered from the base of the fractionator B.

The diisocyanate recovered from the bottom of the fractionator B is fed continuously to a second thin film evaporator C. Advantageously, but not necessarily exclusively, the latter is operated under conditions such that the major portion of the feedstock is recovered therefrom as undistilled bottoms and a minor proportion, from about 5 to about 40 percent by weight, is removed therefrom as a volatile overhead. The second still C is operated at temperatures and pressures which are in the same range as those set forth above for the first thin film evaporator A. The selection of the appropriate relative conditions, which are required in the first thin film evaporator A and in the second thin film evaporator C in order to achieve the desired throughput and ratio of volatile overhead to undistilled bottoms fraction in each evaporator, is one which can be readily made by one skilled in the art and does not require detailed description herein.

The fraction which is taken overhead continuously from the second thin film evaporator C is returned to the fractionator B. This feature of the invention is indicated in FIG. 1 by dotted lines leading from evaporator C back to fractionator B. Where the fractionator B takes the form of a partial condenser optionally preceded by a short packed section and leading to a packed fractionating column, the overhead from the second thin film evaporator C is returned to the base of said fractionating column. The efficiency of separation of 2,4'-isomer from 4,4'-isomer is further enhanced in this particular embodiment of the invention.

In the final step of the process of the invention the undistilled bottoms fraction from the second thin film evaporator C is passed continuously to a third thin film evaporator D. This latter is operated under such conditions of temperature and pressure (within the range quoted above for the first and second thin film evaporators) that the major portion, i.e., more than 50 percent and up to about 90 percent by weight, of the feed is recovered as volatile overhead and only a minor portion of the feed is recovered as undistilled bottoms. In general this result is achieved by operating the third thin film evaporator D at slightly lower pressures (i.e., higher vacuum) or higher temperatures than the previous two thin film evaporators A and C.

The overhead recovered continuously from the third film evaporator D is substantially pure 4,4'-methylenebis(phenyl isocyanate) and is condensed by passage through condenser E and passed to storage. The undistilled bottoms fraction recovered from the third thin film evaporator D is 4,4'-methylenebis(phenyl isocyanate) contaminated with minor amounts of higher boiling material. This fraction can be combined with the feedstock entering the first thin film evaporator A or, alternatively, can be blended, at least in part, with the polymethylene polyphenyl isocyanate, or a portion thereof, recovered as the undistilled bottoms fraction from the first thin film evaporator A.

As will be appreciated by one skilled in the art, when the continuous process of the invention is being operated in a steady state the amount of feed material per unit time entering each of the three thin film evaporators A, C and D will be different and the proportion of the feed material taken as overhead in each of said evaporators will also be different. In order to achieve the proper material balance to maintain the steady state it is therefore necessary to employ thin film evaporators of differing effective surface areas. In general the first thin film evaporator A will have the largest effective surface area and the surface areas of the second (C) and third (D) thin film evaporators, relative to each other and to the surface area of the thin film evaporator A, will depend upon the particular steady state which it is desired to maintain. The relative sizes of surface area required in the three thin film evaporators to achieve any given steady state is readily determined by appropriate calculation by one skilled in the art.

As will readily be seen from the above description, the operation of the process of the invention enables one to recover, on a continuous basis, at least two products namely (i) methylenebis(phenyl isocyanate) having a very high 4,4'-isomer content (greater than about 98 percent by weight) and (ii) polymethylene polyphenyl polyisocyanate, from a feed stock which is polymethylene polyphenyl polyisocyanate containing a higher proportion of diisocyanate than that required in the finished bottom fraction. Further, this is accomplished without subjecting the feed stock to prolonged exposure to high temperature thereby minimizing degradation, polymerization and related changes normally anticipated in the processing of such isocyanates.

The process of the invention eliminates the need to carry out batch fractional distillation of the methylenebis(phenyl isocyanate) recovered from the polymethylene polyphenyl polyisocyanates and thereby represents a substantial saving in cost of production of high grade 4,4'-methylenebis(phenyl isocyanate).

The following example of a process of the invention is given by way of further illustration but it is not to be construed as limiting.

Using the process and apparatus shown schematically in FIG. 1, a feed stock was employed which was a polymethylene polyphenyl polyisocyanate containing approximately 70 percent by weight of methylenebis(phenyl isocyanate) of which approximately 97.5 percent by weight was present as 4,4'-isomer. The feed stock was essentially free from chlorobenzene solvent having been taken from the evaporator stripper unit of a commercial process and was fed at a temperature of 260°F to a thin film evaporator (A) having a surface area of 129 sq. ft. at a rate of 100 lbs. per minute. The thin film evaporator (A) was maintained at a temperature of approximately 363°F and a pressure of 3 mm of mercury. Approximately 52 percent by weight of the feed polyisocyanate was recovered as the overhead fraction and was fed via a partial condenser to approximately the midpoint of a fractionating column (B) having a total of about 9 feet of Koch-Sulzer packing. The remainder (48 percent) of the polyisocyanate fed to the still (A) was recovered as undistilled polymethylene polyphenyl polyisocyanate from the base of the still (A) and contained approximately 38 percent by weight of methylenebis(phenyl isocyanate).

The methylenebis(phenyl isocyanate) recovered from the base of the fractionator (B) was fed to a second thin film evaporator (C), having approximately one-third of the surface area of still (A), which was maintained at substantially the same temperature and pressure as still (A). In the steady state of operation the methylenebis(phenyl isocyanate) was fed to the still C at a rate of 70 lbs. per minute. Approximately 40 percent by weight of this feed was taken as overhead and returned to the fractionator B at a point below the packing therein. The remaining 60 percent (43 lbs. per minute) of the feed methylenebis(phenyl isocyanate) was recovered from still C as undistilled bottoms fraction. The latter was conducted to the third thin film evaporator (D), having approximately one-half the surface area of still (A), in which the temperature was 348°F and the pressure was 2 mm of mercury. In this third still 84 percent by weight of the feed (36 lbs. per minute) was recovered as volatile overhead and was found to be 4,4'-methylenebis(phenyl isocyanate) having the following specifications:

| | | |
|---|---|---|
| Assay, % | = | 99.9 |
| Acidity as HCl, ppm | = | 10 |
| % 4,4'-isomer | = | 98.3 |
| Color APHA | = | 5 |

The undistilled bottoms fraction recovered from still D was methylenebis(phenyl isocyanate) having the following analysis:

| | | |
|---|---|---|
| Assay, % | = | 98.4 |
| % 4,4'-isomer | = | 99.0 |
| Color, APHA | = | >100 |

This fraction was blended with the polymethylene polyphenyl polyisocyanate recovered as bottoms fraction from still (A).

The overhead taken from the top of the fractionator (B) in the above process represented 9 percent by weight of the feed polyisocyanate used in the first still (A) and was blended with the polymethylene polyphenyl polyisocyanate recovered as bottoms fraction from said still (A).

We claim:

1. A continuous process for the partial removal of at least 98% pure 4,4'-methylenebis(phenyl isocyanate) from a feed mixture of polymethylene polyphenyl polyisocyanates, which mixture contains a major proportion by weight of methylenebis(phenyl isocyanate), comprising the steps of
   a. subjecting said feed mixture in a continuous manner to a first partial distillation in a thin film evaporator under reduced pressure and continuously withdrawing from said thin film evaporator methylenebis(phenyl isocyanate) as overhead and polymethylene polyphenyl polyisocyanate as undistilled bottoms fraction;
   b. continuously passing said overhead from said first partial distillation to a fractional distillation zone;
   c. continuously removing an overhead fraction enriched in 2,4'-methylenebis(phenyl isocyanate) from said fractional distillation zone;
   d. continuously passing the bottoms fraction from said fractional distillation zone as liquid feed to a second thin film evaporator wherein said feed is subjected to a second partial distillation under reduced pressure to recover a portion of said feed as overhead;
   e. continuously returning said overhead fraction from said second partial distillation to said fractional distillation zone employed in the previous stage;
   f. subjecting said undistilled bottoms from said second partial distillation to a third partial distillation under reduced pressure in a third thin film evaporator in a continuous manner and recovering at least 98% pure 4,4'-methylenebis(phenyl isocyanate) as overhead and methylenebis(phenyl isocyanate) residues as undistilled bottoms fraction, said overhead comprising the major proportion of the feed to said third thin film evaporator.

2. The process of claim 1 wherein at least a part of the undistilled bottoms fraction from said first partial distillation is blended with at least a part of the undistilled bottoms fraction from said third partial distillation.

3. The process of claim 1 wherein the overhead fraction enriched in 2,4'-isomer, which is recovered from said fractional distillation zone, is blended with at least a part of the undistilled bottoms fraction from said first partial distillation.

4. The process of claim 1 wherein the overhead from said first partial distillation is passed to the fractional distillation zone via a partial condenser.

5. The process of claim 1 wherein the overhead fraction from said second thin film evaporator represents from about 5 to about 40 percent of the feed entering said second thin film evaporator.

6. The process of claim 1 wherein the proportion by weight of overhead to bottoms fraction taken in said first thin film evaporator is within the range of 0.5:1 to 4:1, the fraction taken overhead from the fractional distillation zone represents from 5 to 25 percent by weight of the feed to said zone, the fraction taken overhead from the second thin film evaporator represents from about 5 to about 40 percent by weight of the feed to said second thin film evaporator, and the fraction taken overhead from said third thin film evaporator represents from 50 to 90 percent by weight of the feed to said third film evaporator.

* * * * *